(12) United States Patent
Ruzicka et al.

(10) Patent No.: US 12,435,808 B2
(45) Date of Patent: Oct. 7, 2025

(54) ASSEMBLY HAVING AN ASSEMBLY UNION (U) THAT ORIENTS AND ALIGNS MULTIPLE COMPONENTS, INCLUDING A HOUSING, BODY ADAPTER AND LOCKING RING

(71) Applicant: Fluid Handling LLC, Morton Grove, IL (US)

(72) Inventors: Paul J. Ruzicka, Auburn, NY (US); Matthew John Ruffo, Geneva, NY (US); Kongchi Lui, Macedon, NY (US)

(73) Assignee: FLUID HANDLING LLC, Morton Grove, IL (US)

( * ) Notice: Subject to any disclaimer, the term of this patent is extended or adjusted under 35 U.S.C. 154(b) by 0 days.

(21) Appl. No.: 17/477,995

(22) Filed: Sep. 17, 2021

(65) Prior Publication Data

US 2022/0082174 A1 Mar. 17, 2022

Related U.S. Application Data

(60) Provisional application No. 63/079,582, filed on Sep. 17, 2020.

(51) Int. Cl.
*F16K 27/02* (2006.01)
*F16K 15/02* (2006.01)
*F16L 37/40* (2006.01)

(52) U.S. Cl.
CPC ........ *F16K 27/0209* (2013.01); *F16K 15/021* (2013.01); *F16L 37/40* (2013.01)

(58) Field of Classification Search
CPC .... F16K 27/0209; F16K 15/021; F16L 37/40; Y10T 137/7856
See application file for complete search history.

(56) References Cited

U.S. PATENT DOCUMENTS

| | | | |
|---|---|---|---|
| 1,120,713 A | | 12/1914 | Hennessy |
| 1,873,782 A | * | 8/1932 | Nixon ...................... F04B 53/10 137/515 |
| 2,216,622 A | | 10/1940 | Miller |
| 2,748,798 A | * | 6/1956 | Withrow ............... F16K 15/021 251/367 |
| 3,097,666 A | | 7/1963 | Antrim et al. |
| 4,257,443 A | | 3/1981 | Turney |

(Continued)

FOREIGN PATENT DOCUMENTS

WO    2008/121408 A1    10/2008

*Primary Examiner* — P. Macade Nichols
(74) *Attorney, Agent, or Firm* — William J. Barber; WARE FRESSOLA MAGUIRE & BARBER LLP

(57) ABSTRACT

A check valve assembly includes multiple components. for coupling together first and second pipes, and has multiple components, including a check valve, a check valve housing, a check valve body adapter and a locking ring. A mating surface coupling between a check valve body adapter inlet mating surface and a check valve housing outlet mating surface together with a flange coupling between a check valve body adapter inlet coupling flange and a locking ring inwardly extending and circumferentially extending flange combines to form a check valve assembly union U that allows the multiple components of the check valve assembly to freely orient and align when the check valve assembly is threaded and coupled to the first and second pipes.

7 Claims, 3 Drawing Sheets

An assembly having multiple components for coupling together first and second pipes or piping

(56) References Cited

U.S. PATENT DOCUMENTS

| | | | | |
|---|---|---|---|---|
| 4,279,403 A * | 7/1981 | Hobson | | F16K 27/0209 137/527 |
| 4,369,808 A * | 1/1983 | Hagman | | F16K 15/021 137/533.19 |
| 4,532,958 A | 8/1985 | Napolitano | | |
| 4,570,669 A | 2/1986 | Pauliukonis | | |
| 4,655,248 A * | 4/1987 | Chalaire | | F16K 15/021 137/515.7 |
| 4,665,943 A * | 5/1987 | Medvick | | F16K 15/00 137/543.17 |
| 4,681,132 A * | 7/1987 | Lardner | | F16K 17/02 137/271 |
| 4,811,756 A | 3/1989 | Hall | | |
| 4,852,602 A * | 8/1989 | McKinnon | | B05B 15/74 137/513.5 |
| 4,856,823 A * | 8/1989 | Heren | | F16L 37/40 285/308 |
| 4,872,476 A | 10/1989 | Pflum | | |
| 4,938,272 A | 7/1990 | Sandy, Jr. et al. | | |
| 4,979,721 A | 12/1990 | Gilbert | | |
| 5,033,503 A * | 7/1991 | Horton | | F16L 29/00 137/454.2 |
| 5,462,081 A * | 10/1995 | Perusek | | F16K 17/30 137/498 |
| 5,758,682 A | 6/1998 | Cain | | |
| 5,829,952 A * | 11/1998 | Shadden | | F16K 15/021 417/547 |
| 6,029,685 A * | 2/2000 | Carruth | | F16K 27/0209 137/533.15 |
| 6,105,609 A * | 8/2000 | Polidan | | F16K 15/141 137/550 |
| 6,401,749 B1 | 6/2002 | Tai et al. | | |
| 7,013,910 B2 | 3/2006 | Tripp | | |
| 7,111,638 B2 * | 9/2006 | Johnson | | F16K 17/34 137/460 |
| 7,591,291 B2 | 9/2009 | Mackey et al. | | |
| 9,046,182 B2 * | 6/2015 | Fukano | | F16K 15/144 |
| 9,404,244 B1 * | 8/2016 | Gass | | E03B 7/077 |
| 9,752,473 B1 | 9/2017 | Burns et al. | | |
| 9,885,422 B2 | 2/2018 | Driscoll et al. | | |
| 10,267,428 B2 | 4/2019 | Fudge et al. | | |
| 10,370,834 B2 | 8/2019 | Ball et al. | | |
| 10,544,569 B2 | 1/2020 | Chalfin | | |
| 10,738,901 B1 * | 8/2020 | Andersson | | F16K 15/063 |
| 11,248,719 B2 * | 2/2022 | Maleki | | F16K 35/04 |
| 2003/0201012 A1 * | 10/2003 | Fukano | | F16K 15/144 137/515.5 |
| 2005/0284521 A1 | 12/2005 | Chang | | |
| 2007/0044848 A1 * | 3/2007 | Norman | | F16K 27/0209 137/542 |
| 2007/0193633 A1 * | 8/2007 | Howell | | F16K 15/063 137/542 |
| 2008/0115843 A1 * | 5/2008 | Wang | | F16K 15/021 137/533.17 |
| 2008/0236671 A1 * | 10/2008 | Claude | | F16K 15/00 137/15.19 |
| 2009/0283157 A1 * | 11/2009 | Hogan | | F16K 15/063 137/542 |
| 2010/0200087 A1 * | 8/2010 | Andrews | | F16K 11/044 137/533.17 |
| 2013/0099486 A1 * | 4/2013 | Weh | | F16K 15/026 285/347 |
| 2014/0000730 A1 * | 1/2014 | Nguyen | | F16K 15/021 137/511 |
| 2015/0034195 A1 | 2/2015 | Shima et al. | | |
| 2015/0300518 A1 * | 10/2015 | Hayashi | | F16K 15/063 137/543.15 |
| 2016/0327169 A1 * | 11/2016 | Yazykov | | F16K 15/06 |
| 2016/0334026 A1 | 11/2016 | Wadhwani et al. | | |
| 2016/0348471 A1 * | 12/2016 | Kenney | | F16K 17/26 |
| 2019/0120397 A1 * | 4/2019 | Baer | | F16K 15/04 |
| 2019/0293179 A1 * | 9/2019 | Hiramatsu | | F16K 15/026 |
| 2020/0284369 A1 * | 9/2020 | Collins | | F16K 27/0209 |
| 2020/0378508 A1 * | 12/2020 | Allen | | F16K 15/18 |

* cited by examiner

Figure 1 - An assembly having multiple components for coupling together first and second pipes or piping Figure 2 - Check Valve Assembly, as assembled

ASSEMBLY HAVING AN ASSEMBLY UNION (U) THAT ORIENTS AND ALIGNS MULTIPLE COMPONENTS, INCLUDING A HOUSING, BODY ADAPTER AND LOCKING RING

CROSS-REFERENCE TO RELATED APPLICATION

This application claims benefit to provisional patent application Ser. No. 63/079,582, filed 17 Sep. 2020, which is hereby incorporated by reference in its entirety.

BACKGROUND OF THE INVENTION

1. Field of the Invention

The present invention relates to a check valve assembly having a check valve arranged therein and being configured to couple together pipes or piping.

2. Brief Description of Related Art

Check valve assemblies having multiple components, including a check valve arranged therein, and being configured to couple and thread piping on each end are known in the art.

However, the known check valves suffer from the problem of not allowing the multiple components to freely orient and align, e.g. when the check valve assembly is coupled and threaded to the ends of the piping.

Because of this, there is a need in the industry for a better check valve assembly.

SUMMARY OF THE PRESENT INVENTION

The subject matter of the present invention is a check valve assembly having various aspects thereto, and the disclosure related to one aspect analogously applies to other aspects of the invention, e.g., consistent with that set forth herein as follows: By way of example, and according to some embodiments, a check valve assembly may include multiple components, e.g. for coupling together first and second pipes. By way of example, the multiple components may include a check valve, a check valve housing, a check valve body adapter and a locking ring.

The check valve may include a check valve inlet, a check valve outlet and a check valve body and be configured to allow a fluid to flow in only one direction from the check valve inlet, through the check valve body, and from the check valve outlet.

The check valve housing may include a check valve housing inlet, a check valve housing outlet and a check valve housing inner passageway. According to some embodiments, the check valve housing inlet may include check valve housing inlet threads configured to thread the check valve assembly to a first pipe. The check valve housing outlet may include a check valve housing outlet mating surface and check valve housing outlet threads. The check valve housing inner passageway may include a check valve housing inner circumferential rim configured to receive the check valve inlet of the check valve in a sealing manner, the check valve housing inner passageway allowing the fluid to flow from the check valve housing inlet, through the check valve, and from the check valve housing outlet.

The check valve body adapter may include a check valve body adapter inlet, a check valve body adapter outlet and a check valve body adapter inner passageway. The check valve body adapter inlet may include a check valve body adapter inlet mating surface, a check valve body adapter opening and a check valve body adapter inlet coupling flange. The check valve body adapter inlet mating surface may be configured to couple to the check valve housing outlet mating surface in a sealing manner to form a mating surface coupling when the check valve body adapter is coupled to the check valve housing. The check valve body adapter opening may be configured to allow the fluid to flow from the check valve housing outlet to the check valve body adapter. According to some embodiments, the check valve body adapter outlet may include outlet threads configured to thread the check valve assembly to a second pipe. The check valve body adapter inner passageway may be configured to allow the fluid to flow from the check valve body adapter opening, through the check valve body adapter and to the second pipe.

The locking ring may include a locking ring inwardly and circumferentially extending flange and a locking ring portion. The locking ring inwardly and circumferentially extending flange may be configured to couple to the check valve body adapter inlet coupling flange to form a flange coupling to mate and seal the check valve body adapter inlet mating surface and the check valve housing outlet mating surface when the locking ring is coupled to the check valve housing. The locking ring portion may include locking ring threads configured to thread to the check valve housing outlet threads and couple the locking ring to the check valve housing.

The mating surface coupling together with the flange coupling combining to form a check valve assembly union that allows the multiple components of the check valve assembly to freely orient and align when the check valve assembly is threaded to the first and second pipes.

By way of further example, the check valve may also include one or more of the following features:

The check valve assembly may include an O-ring configured to provide an O-ring seal between the check valve body adapter inlet mating surface and the check valve housing outlet mating surface.

The check valve assembly may include at least one O-ring configured to provide an O-ring seal between the check valve inlet and the check valve housing inner passageway.

The locking ring portion may be configured to extend perpendicular to the locking ring inwardly and circumferentially extending flange.

The check valve may be made from Neoperl®.

The check valve may be a swing check valve or a duckbill check valve.

The check valve housing outlet having the check valve housing outlet threads and the check valve body adapter outlet having the outlet threads are dimensioned and adapted to thread to different sized first and second pipes.

The check valve adapter opening may be dimensioned and configured to receive at least some part of the check valve outlet.

The check valve body adapter inlet mating surface may be formed with a check valve body adapter inlet circumferential groove or channel configured to receive the O-ring.

The check valve body adapter inlet mating surface and the check valve housing outlet mating surface may be configured as corresponding flat mating surfaces.

Advantages

One advantage of the check valve assembly according to the present invention is that it allows its multiple components to freely orient and align, e.g. when the check valve assembly is coupled and threaded to the ends of the piping.

Moreover, the multiple components/parts serve a few important purposes—to install the check valve, allow transition from one pipe size to another, and allow the mating components to be aligned as required in the installation, e.g., when components/parts get threaded together one can't guarantee that the resulting orientation and alignment are as required; hence the union and the nut according to the present invention allow the components/parts to freely orient and align all assembled parts as required. All this is accomplished in a greatly reduced length and cost compared to known stainless steel (SS) pipe fittings currently used and required by known systems, e.g., where the known SS pipe fittings cost about $23 and the check valve assembly according to the present invention cost about $6

BRIEF DESCRIPTION OF THE DRAWING

The drawing, which is not necessarily drawn to scale, includes the following Figures.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Figure 1:
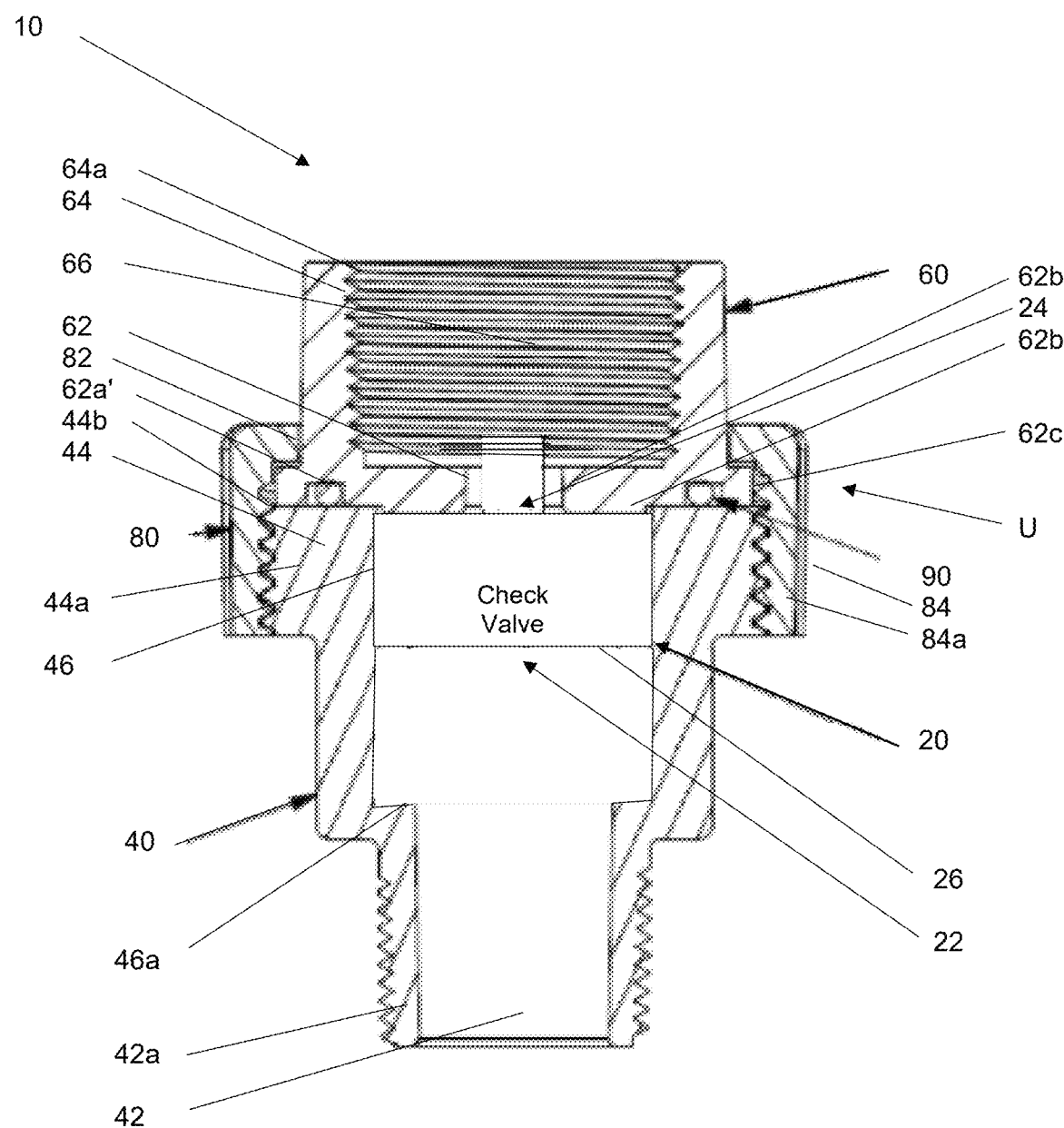
FIG. 1 shows a cross-sectional view of an assembly having multiple components for coupling together first and second pipes or piping, according to some embodiments of the present invention.
Figure 2:
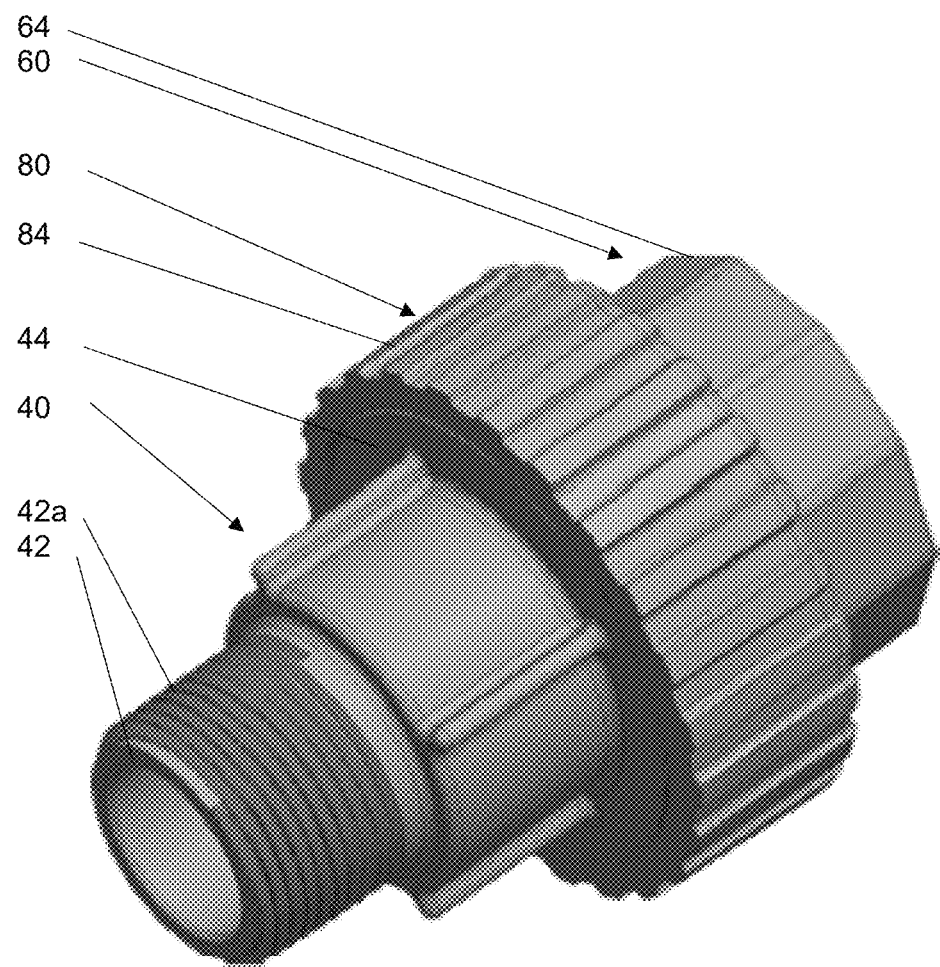
FIG. 2 shows a perspective view of the check valve assembly in FIG. 1 when assembled.
Figure 3:
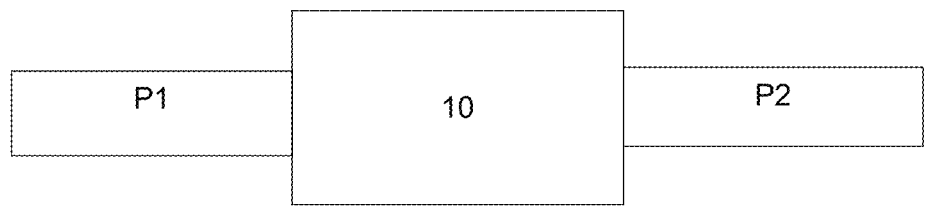
FIG. 3 is a diagram showing the check valve assembly according to the present invention coupled to first and second pipes or piping P1, P2.

FIGS. 1 and 2 shows a check valve assembly (CVA) generally indicated as 10, which includes multiple components, e.g., for coupling together first and second pipes or piping P1, P2 (FIG. 3). By way of example, the multiple components may include a check valve 20, a check valve housing 40, a check valve body adapter 60 and a locking ring 80.

The Check Valve 20

The check valve 20 may include a check valve inlet 22, a check valve outlet 24 and a check valve body 26 and be configured to allow a fluid to flow in only one direction from the check valve inlet 22, through the check valve body 26, and from the check valve outlet 24. By way of example, the check valve 20 may be made from Neoperl®, and may be a swing check valve or a duckbill check valve. Check valves like element 20 are known in the art, and the scope of the invention is not intended to be limited to any particular type or kind thereof either now known or later developed in the future.

The Check Valve Housing 40

By way of example, the check valve housing 40 may include a check valve housing inlet 42, a check valve housing outlet 44 and a check valve housing inner passageway 46. However, the scope of the invention is intended to include, and embodiments are envisioned in which, other types or kinds of couplings between the check valve housing inlet 42 and the first pipe P1, e.g., that are either now known or later developed in the future.

According to some embodiments, the check valve housing inlet 42 may include check valve housing inlet threads 42a configured to thread the check valve assembly 10 to a first pipe P1 (FIG. 3).

The check valve housing outlet 44 may include a check valve housing outlet mating surface 44a and check valve housing outlet threads 44b.

The check valve housing inner passageway 46 may include a check valve housing inner circumferential rim 46a configured to receive and seat the check valve inlet 22 of the check valve 20 in a sealing manner. The check valve housing inner passageway 46 allows the fluid to flow from the check valve housing inlet 42, through the check valve 20, and from the check valve housing outlet 44.

The check valve housing outlet 44 may include check valve housing outlet threads 44b, which may be dimensioned and adapted to thread to corresponding threads of the first pipe P1.

The Check Valve Body Adapter 60

The check valve body adapter 60 may include a check valve body adapter inlet 62, a check valve body adapter outlet 64 and a check valve body adapter inner passageway 66.

The check valve body adapter inlet 62 may include a check valve body adapter inlet mating surface 62a, a check valve body adapter opening 62b and a check valve body adapter inlet coupling flange 62c. The check valve body adapter inlet mating surface 62a may be configured to couple to the check valve housing outlet mating surface 44a in a sealing manner to form a mating surface coupling when the check valve body adapter 60 is coupled to the check valve housing 40. By way of example, the check valve body adapter inlet mating surface 62a and the check valve housing outlet mating surface 44a may be configured as corresponding flat mating surfaces, e.g., consistent with that shown in FIG. 1. The check valve body adapter opening 62b may be configured to allow the fluid to flow from the check valve housing outlet 44 to the check valve body adapter 60.

According to some embodiments, the check valve body adapter outlet 64 may include outlet threads 64a configured to thread the check valve assembly 10 to corresponding threads of a second pipe P2 (FIG. 3). However, the scope of the invention is intended to include, and embodiments are envisioned in which, other types or kinds of couplings between the check valve body adapter outlet 64 and the second pipe P2, e.g., that are either now known or later developed in the future.

The check valve body adapter inner passageway 66 may be configured to allow the fluid to flow from the check valve body adapter opening 62b, through the check valve body adapter 60 and to the second pipe P2.

The check valve body adapter opening 62b may be dimensioned and configured to receive at least some part of the check valve outlet 24.

The check valve body adapter inlet mating surface 62a may be formed with a check valve body adapter inlet circumferential groove or channel 62a' configured to receive the O-ring 90.

The Locking Ring 80

The locking ring 80 may include a locking ring inwardly and circumferentially extending flange 82 and a locking ring portion 84.

The locking ring inwardly and circumferentially extending flange 82 may be configured to couple to the check valve body adapter inlet coupling flange 62c to form a flange coupling to mate and seal the check valve body adapter inlet mating surface 62a and the check valve housing outlet mating surface 44a when the locking ring 80 is coupled to the check valve housing 40.

The locking ring portion 84 may include locking ring threads 84a configured to thread to the check valve housing outlet threads 44b and couple the locking ring 80 to the check valve housing 40.

The locking ring portion 84 may be configured to extend perpendicular to the locking ring inwardly and circumferentially extending flange 82, e.g., consistent with that shown in FIG. 1.

The Check Valve Assembly Union U

The mating surface coupling between the check valve housing outlet mating surface 44a and the check valve body adapter inlet mating surface 62a together with the flange coupling between the check valve body adapter inlet coupling flange 62c and the locking ring inwardly extending and circumferentially extending flange 82 combine to form a check valve assembly union generally indicated as U that allows the multiple components of the check valve assembly 10 to freely orient and align when the check valve assembly 10 is threaded to the first and second pipes P1, P2. In other words, the check valve assembly union U allows the multiple components of the check valve assembly and the pipes P1, P2 the freedom to axially align with one another so that the multiple components may form a sealing relationship with one another.

The O-Rings 90, 92

The check valve assembly 10 may include one or more O-rings to seal the multiple components in relation to one another.

For example, check valve assembly 10 may include an O-ring 90 configured to provide an O-ring seal between the check valve body adapter inlet mating surface 62a and the check valve housing outlet mating surface 44a, e.g., when forming the check valve assembly union U.

The check valve assembly 10 may also include at least one O-ring 92 configured to provide an O-ring seal between the check valve inlet 22 and a circumferential wall of the check valve housing inner passageway 46, e.g., when forming the check valve assembly union U.

FIG. 4

Figure 4:
FIG. 4 shows a pumping system having a drive and pump/motor system assembly coupled by a check valve assembly 10' that is known in the art and not configured according to the present invention.

FIG. 4 shows a pumping system having a drive 100 and a pump/motor system assembly 110 coupled to associated piping by a check valve assembly 10 according to the present invention. One skilled in the art would appreciate the ability of the check valve assembly 10 to orient and align its multiple components, e.g., when used in a coupling manner like that shown in FIG. 4 where the drive and the pump/motor assembly need to be in line.

Possible Applications

The present invention can be used in any applications, e.g., where pipes or piping are threaded and coupled together by a check valve assembly including multiple components with a check valve therein.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. An assembly having multiple components that couple first and second pipes together having different pipe sizes, comprising:
    a housing that allows a flow of fluid through the assembly, the housing having a housing inlet with housing inlet threads that are threaded externally and configured such that the assembly threads to a first pipe having a first size, having a housing outlet with a housing outlet mating surface and housing outlet threads, and having an inner passageway that has an inner circumferential rim that allows the flow of fluid from the housing inlet to the housing outlet;
    a body adapter having a body adapter inlet with a body adapter inlet mating surface that couples to the housing outlet mating surface having a body adapter inlet circumferential groove or channel with an O-ring in a sealing manner forming a mating surface coupling when the body adapter is coupled to the housing, with a body adapter opening that allows the flow of the fluid from the housing outlet to the body adapter, and with a body adapter inlet coupling flange, having a body adapter outlet with outlet threads that are threaded internally and configured such that the assembly threads to a second pipe having a second size that is different than the first size, and having a body adapter inner passageway that allows the flow of the fluid from the body adapter opening, through the body adapter and to the second pipe; and
    a locking ring having an inwardly and circumferentially extending flange that couples to the body adapter inlet coupling flange and forms a flange coupling configured such that the body adapter inlet mating surface and the housing outlet mating surface mate and seal when the locking ring is coupled to the housing, and having a locking ring portion with locking ring threads that thread to the housing outlet threads and couple the locking ring to the housing;

the mating surface coupling together with the flange coupling forming an assembly union (U) that orients and aligns the multiple components of the assembly, forms a sealing relationship when the assembly is threaded to the first and second pipes and allows a transition from one pipe size to another pipe size.

2. An assembly according to claim 1, wherein the assembly comprises an O-ring that provides an O-ring seal between the body adapter inlet mating surface and the housing outlet mating surface.

3. An assembly according to claim 1, wherein the locking ring portion extends perpendicular to the inwardly and circumferentially extending flange.

4. An assembly according to claim 1, wherein the body adapter inlet mating surface comprises a body adapter inlet circumferential groove or channel that receives the O-ring.

5. An assembly according to claim 1, wherein the body adapter inlet mating surface and the housing outlet mating surface are corresponding flat mating surfaces.

6. An assembly according to claim 1, wherein the outlet threads of the body adapter outlet are threaded internally.

7. An assembly according to claim 3, wherein the housing is configured to receive a check valve.

\* \* \* \* \*